US011919505B2

(12) United States Patent
Sugimoto (10) Patent No.: US 11,919,505 B2
(45) Date of Patent: Mar. 5, 2024

(54) CONTROL DEVICE OF HYBRID ELECTRIC VEHICLE AND CONTROL PROGRAM OF HYBRID ELECTRIC VEHICLE

(71) Applicant: TOYOTA JIDOSHA KABUSHIKI KAISHA, Toyota (JP)

(72) Inventor: Hitoki Sugimoto, Toyota (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 24 days.

(21) Appl. No.: 17/536,570

(22) Filed: Nov. 29, 2021

(65) Prior Publication Data

US 2022/0242392 A1 Aug. 4, 2022

(30) Foreign Application Priority Data

Jan. 29, 2021 (JP) .................................. 2021-012553

(51) Int. Cl.
| | |
|---|---|
| *F01N 11/00* | (2006.01) |
| *B60W 10/06* | (2006.01) |
| *B60W 20/16* | (2016.01) |
| *B60W 50/02* | (2012.01) |
| *F02D 41/02* | (2006.01) |

(Continued)

(52) U.S. Cl.
CPC ............ *B60W 20/16* (2016.01); *B60W 10/06* (2013.01); *B60W 50/0205* (2013.01); *F02D 41/029* (2013.01); *B60W 2050/0083* (2013.01); *B60W 2050/021* (2013.01); *B60W 2710/0622* (2013.01); *B60W 2710/0694* (2013.01); *B60W 2710/081* (2013.01); *F02D 41/1441* (2013.01);

(Continued)

(58) Field of Classification Search
CPC ...... B60W 10/06; B60W 10/08; B60W 20/00; B60W 20/16; B60W 50/0205; B60W 2050/0083; B60W 2050/021; B60W 2710/0622; B60W 2710/0694; F02D 41/029

See application file for complete search history.

(56) References Cited

U.S. PATENT DOCUMENTS 7,641,009 B2 * 1/2010 Akimoto ............... B60W 10/04
180/65.265
9,821,796 B2 * 11/2017 Inoue ..................... F01N 9/002
(Continued)

FOREIGN PATENT DOCUMENTS

JP 2010-179712 A 8/2010
JP 2019-218917 A 12/2019

*Primary Examiner* — Gonzalo Laguarda
(74) *Attorney, Agent, or Firm* — Finnegan, Henderson, Farabow, Garrett & Dunner, LLP (57) ABSTRACT

A control device can execute a first diagnosis process of, when first execution conditions are met, diagnosing whether an air-fuel ratio sensor has an abnormality while executing a motoring process, and a second diagnosis process of, when second execution conditions are met, diagnosing whether a GPF has an abnormality while executing the motoring process. In an execution determination process, the control device prohibits execution of both the first diagnosis process and the second diagnosis process when at least either the first execution conditions or the second execution conditions are not met, and permits execution of both the first diagnosis process and the second diagnosis process when both the first execution conditions and the second execution conditions are met.

8 Claims, 3 Drawing Sheets

(51) Int. Cl.
*B60W 50/00* (2006.01)
*F02D 41/14* (2006.01)

(52) U.S. Cl.
CPC ............... *F02D 2200/0802* (2013.01); *F02D 2200/0812* (2013.01)

(56) References Cited

U.S. PATENT DOCUMENTS

10,408,143 B2 * 9/2019 Dudar ................. F02D 41/0045
11,060,437 B2 * 7/2021 Dudar ..................... F02D 41/18

* cited by examiner

FIG. 1

CONTROL DEVICE OF HYBRID ELECTRIC VEHICLE AND CONTROL PROGRAM OF HYBRID ELECTRIC VEHICLE

CROSS-REFERENCE TO RELATED APPLICATION

This application claims priority to Japanese Patent Application No. 2021-012553 filed on Jan. 29, 2021, incorporated herein by reference in its entirety.

BACKGROUND

1. Technical Field

The present disclosure relates to a control device of a hybrid electric vehicle and a control program of a hybrid electric vehicle.

2. Description of Related Art

The vehicle disclosed in Japanese Unexamined Patent Application Publication No. 2010-179712 (JP 2010-179712 A) has an internal combustion engine, a motor-generator, and a control device. The internal combustion engine has cylinders and an output shaft that rotates in accordance with combustion of fuel inside the cylinders. The motor-generator is coupled to the output shaft of the internal combustion engine. The motor-generator can rotate the output shaft of the internal combustion engine by applying torque to the output shaft.

The control device can execute a motoring process of rotating the output shaft of the internal combustion engine by the motor-generator in a state where fuel supply to the cylinders is stopped. While executing this motoring process, the control device performs a diagnosis on a plurality of diagnosis items relating to the internal combustion engine.

SUMMARY

In the technology of diagnosing an internal combustion engine using the motoring process as in JP 2010-179712 A, some diagnosis items may require that the state of the internal combustion engine meet certain conditions in order to obtain an appropriate diagnosis result. When there are such diagnosis items, depending on the state of the internal combustion engine at the time of execution of the motoring process, it is not always possible to perform a diagnosis on those diagnosis items that require meeting the conditions. If there is even one diagnosis item that remains to be performed, the motoring process needs to be performed again just for a diagnosis on that diagnosis item.

A control device of a hybrid electric vehicle to solve this problem is a control device applied to a hybrid electric vehicle having an internal combustion engine and an electric motor capable of rotating an output shaft of the internal combustion engine. The internal combustion engine includes an air-fuel ratio sensor that detects the air-fuel ratio of exhaust gas, a filter that collects fine particulate matter in the exhaust gas, and state detection sensors that detect the temperature or the pressure of the exhaust gas on the upstream side and the downstream side of the filter. The control device is capable of executing: a motoring process of rotating the output shaft of the internal combustion engine by the electric motor in a state where fuel supply to cylinders of the internal combustion engine is stopped; a first diagnosis process of, when first execution conditions including that there is no output demand for the internal combustion engine are met, diagnosing whether the air-fuel ratio sensor has an abnormality based on a detection signal of the air-fuel ratio sensor while executing the motoring process; and a second diagnosis process of, when second execution conditions including that there is no output demand for the internal combustion engine and including a different condition from the first execution conditions are met, diagnosing whether the filter has an abnormality based on detection signals of the state detection sensors while executing the motoring process. The control device performs an execution determination process of prohibiting execution of both the first diagnosis process and the second diagnosis process when at least either the first execution conditions or the second execution conditions are not met, and permitting execution of both the first diagnosis process and the second diagnosis process when both the first execution conditions and the second execution conditions are met.

In this configuration, even when the first execution conditions are met, execution of both the diagnosis processes is prohibited unless the second execution conditions are met. It is therefore impossible that only one of the two diagnosis processes for which the execution conditions are different is performed. On the other hand, when both the first execution conditions and the second execution conditions are met, execution of both the diagnosis processes is permitted. Thus, the two diagnosis processes can be executed at the same time when both the execution conditions for the two diagnosis processes are satisfied. This configuration can minimize the number of times that the motoring process is executed to diagnose the internal combustion engine using the motoring process.

In the control device of a hybrid electric vehicle, the state detection sensors may be a first temperature sensor that detects the temperature of the exhaust gas on the upstream side of the filter and a second temperature sensor that detects the temperature of the exhaust gas on the downstream side of the filter. The second execution conditions may include that the temperature detected by the first temperature sensor or the temperature detected by the second temperature sensor is equal to or higher than a specified temperature.

When the motoring process is performed, the temperature of gas flowing through the exhaust gas passage decreases gradually as air is introduced into the exhaust gas passage. Thus, when the motoring process is started, the temperature of the gas inside the exhaust gas passage decreases on both the upstream side and the downstream side of the filter. When the filter is present, during a period of execution of the motoring process, the gas receives heat from the filter that has been warmed before the start of the motoring process, while passing through the filter. Therefore, after the motoring process is started with the exhaust gas having a certain high temperature, the temperatures on the upstream side and the downstream side of the filter and how those temperatures change vary depending on whether the filter is correctly mounted and whether there is a gas leak inside the filter. The above-described configuration makes it possible to correctly diagnose whether the filter has an abnormality by performing this abnormality diagnosis based on the temperatures on the upstream side and the downstream side of the filter in a situation where the temperature of the exhaust gas is equal to or higher than a specified temperature.

In the control device of a hybrid electric vehicle, when an amount of change per unit time in the temperature detected by the first temperature sensor is called a first temperature change amount, and an amount of change per unit time in the temperature detected by the second temperature sensor is called a second temperature change amount, in the second diagnosis process, whether the filter has an abnormality may be diagnosed based on a value obtained by integrating, over a fixed period after the start of the motoring process, a detection parameter that is a value obtained by subtracting the first temperature change amount from the second temperature change amount.

The detection parameter is a variable representing the amount of heat that the gas receives from the filter while passing through the filter. As described above, the amount of heat that the gas receives from the filter varies according to whether the filter has an abnormality. Therefore, whether the filter has an abnormality can be appropriately diagnosed by diagnosing the filter using the detection parameter.

In the control device of a hybrid electric vehicle, the second execution conditions may include that the temperature detected by the first temperature sensor is equal to or higher than the temperature detected by the second temperature sensor.

If the filter has been removed from the exhaust gas passage, the gas is not subjected to the influence of heat from the filter, so that the detection parameter becomes close to zero. Conversely, when the filter is present in the exhaust gas passage and the gas receives heat from the filter, the value of the detection parameter becomes larger than zero. The above-described configuration is suitable for making a distinction between normality and abnormality of the filter using the detection parameter that exhibits such characteristics.

A control program of a hybrid electric vehicle to solve the above problem is a control program of a hybrid electric vehicle having an internal combustion engine and an electric motor capable of rotating an output shaft of the internal combustion engine. The internal combustion engine includes an air-fuel ratio sensor that detects the air-fuel ratio of exhaust gas, a filter that collects fine particulate matter in the exhaust gas, and state detection sensors that detect the temperature or the pressure of the exhaust gas on the upstream side and the downstream side of the filter. The control program causes a control device of the hybrid electric vehicle to execute: a motoring process of rotating the output shaft of the internal combustion engine by the electric motor in a state where fuel supply to cylinders of the internal combustion engine is stopped; a first diagnosis process of, when first execution conditions including that there is no output demand for the internal combustion engine are met, diagnosing whether the air-fuel ratio sensor has an abnormality based on a detection signal of the air-fuel ratio sensor while executing the motoring process; a second diagnosis process of, when second execution conditions including that there is no output demand for the internal combustion engine and including a different condition from the first execution conditions are met, diagnosing whether the filter has an abnormality based on detection signals of the state detection sensors while executing the motoring process; and an execution determination process of prohibiting execution of both the first diagnosis process and the second diagnosis process when at least either the first execution conditions or the second execution conditions are not met, and permitting execution of both the first diagnosis process and the second diagnosis process when both the first execution conditions and the second execution conditions are met.

In this configuration, even when the first execution conditions are met, execution of both the diagnosis processes is prohibited unless the second execution conditions are met. It is therefore impossible that only one of the two diagnosis processes for which the execution conditions are different is performed. On the other hand, when both the first execution conditions and the second execution conditions are met, execution of both the diagnosis processes is permitted. Thus, the two diagnosis processes can be executed at the same time when both the execution conditions for the two diagnosis processes are satisfied. This configuration can minimize the number of times that the motoring process is executed to diagnose the internal combustion engine using the motoring process.

BRIEF DESCRIPTION OF THE DRAWINGS

Features, advantages, and technical and industrial significance of exemplary embodiments of the present disclosure will be described below with reference to the accompanying drawings, in which like signs denote like elements, and wherein.

DETAILED DESCRIPTION OF EMBODIMENTS

One embodiment of a control device of a hybrid electric vehicle will be described below with reference to the drawings.

General Configuration of Vehicle

Figure 1:
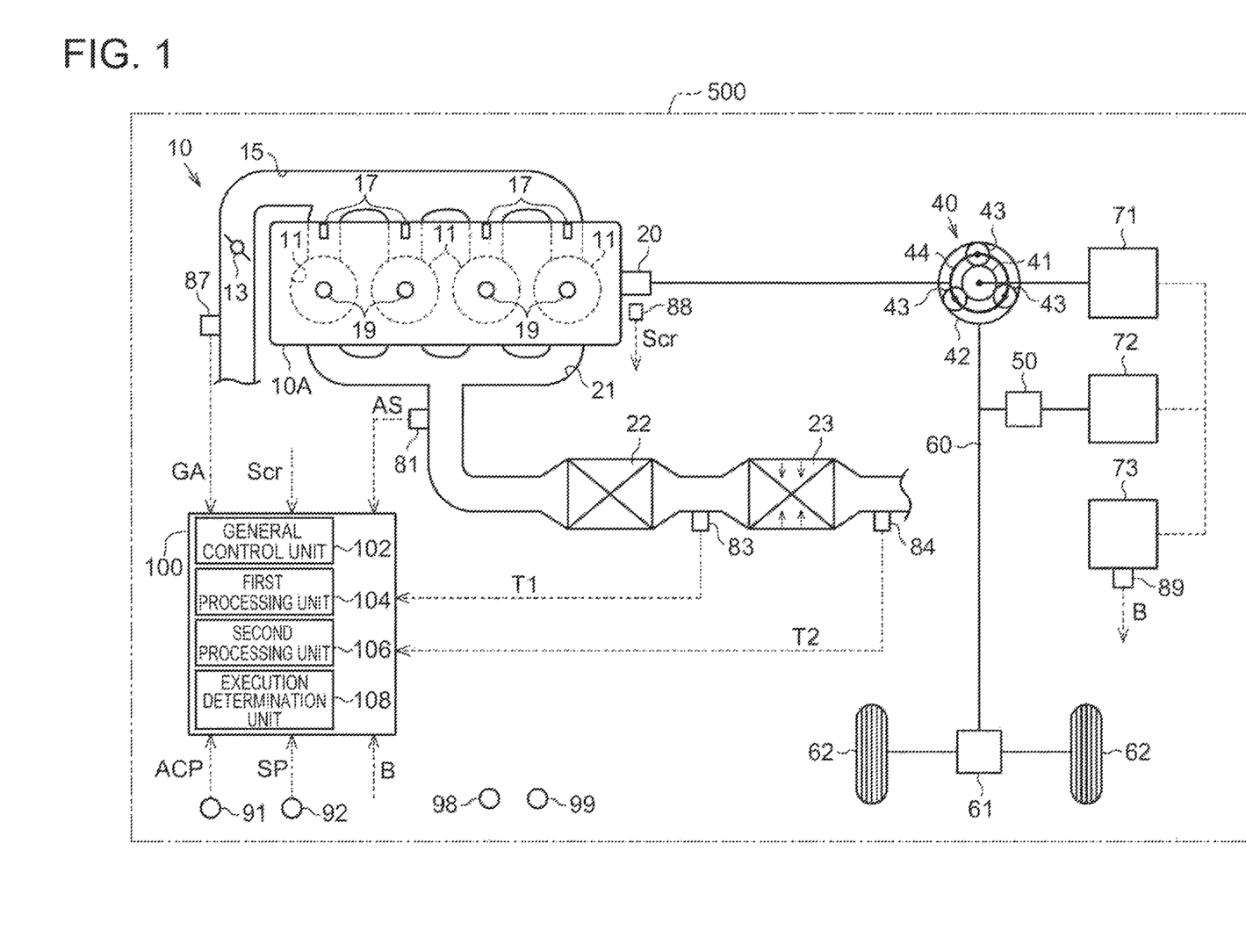
FIG. 1 is a schematic configuration diagram of a vehicle.

As shown in FIG. 1, a hybrid electric vehicle (hereinafter referred to as a "vehicle") 500 has an internal combustion engine 10, a first motor-generator (hereinafter referred to as a "first MG") 71, a second motor-generator (hereinafter referred to as a "second MG") 72, a battery 73, and a battery sensor 89. The vehicle 500 further has a planetary gear mechanism 40, a reduction gear 50, a driveshaft 60, a differential 61, and drive wheels 62.

The internal combustion engine 10, the first MG 71, and the second MG 72 serve as drive sources of the vehicle 500. Details of the internal combustion engine 10 will be described later. The first MG 71 is a power generating electric motor having the functions of both an electric motor and a power generator. Like the first MG 71, the second MG 72 is a power generating electric motor. The first MG 71 and the second MG 72 are electrically connected to the battery 73 through an inverter. The battery 73 supplies electricity to the first MG 71 and the second MG 72 and stores electricity supplied from the first MG 71 and the second MG 72. The inverter performs power conversion between direct current and alternating current. The inverter is not shown in FIG. 1. The battery sensor 89 is mounted on the battery 73. The battery sensor 89 detects battery information B including the current, voltage, and temperature of the battery 73.

The internal combustion engine 10 and the first MG 71 are coupled to the planetary gear mechanism 40. The planetary gear mechanism 40 has a sun gear 41, a ring gear 42, a plurality of pinion gears 43, and a carrier 44. The sun gear 41 is an external gear. The ring gear 42 is an internal gear. The ring gear 42 can rotate on the same axis as the sun gear 41. The pinion gears 43 are interposed between the sun gear 41 and the ring gear 42. The pinion gears 43 mesh with both the sun gear 41 and the ring gear 42. The carrier 44 supports the pinion gears 43. The carrier 44 can rotate on the same axis as the sun gear 41.

The sun gear 41 is coupled to a rotating shaft of the first MG 71. The carrier 44 is coupled to a crankshaft 20 that is an output shaft of the internal combustion engine 10. The ring gear 42 is coupled to the driveshaft 60. The driveshaft 60 is coupled to the second MG 72 through the reduction gear 50. The reduction gear 50 transmits the torque of the second MG 72 to the driveshaft 60 after reducing the speed thereof. The driveshaft 60 is coupled to the left and right drive wheels 62 through the differential 61. The differential 61 allows a difference in rotation speed to occur between the left and right drive wheels 62.

The internal combustion engine 10 and the first MG 71 can transmit power to each other through the planetary gear mechanism 40. When the torque of the internal combustion engine 10 is input into the first MG 71, the first MG 71 functions as a power generator. On the other hand, when the first MG 71 functions as an electric motor, the crankshaft 20 can be rotated by the torque of the first MG 71.

When the vehicle 500 decelerates, the second MG 72 functions as a power generator, so that a regenerative braking force corresponding to the amount of power generated by the second MG 72 is generated in the vehicle 50). On the other hand, when the second MG 72 functions as an electric motor, the torque of the second MG 72 can be input into the drive wheels 62 through the reduction gear 50, the driveshaft 60, and the differential 61.

The vehicle 500 has an accelerator sensor 91 and a vehicle speed sensor 92. The accelerator sensor 91 detects an accelerator operation amount ACP that is an amount of operation of an accelerator pedal in the vehicle 500. The vehicle speed sensor 92 detects a vehicle speed SP that is a travel speed of the vehicle 500.

While this is not shown, the vehicle 500 has a first alert lamp 98 and a second alert lamp 99. The first alert lamp 98 and the second alert lamp 99 are located inside a cabin of the vehicle 50. The first alert lamp 98 and the second alert lamp 99 are lamps that warn of abnormalities about the internal combustion engine 10.

General Configuration of Internal Combustion Engine

The internal combustion engine 10 has an engine main body 10A, the crankshaft 20, and a crank angle sensor 88.

The engine main body 10A has four cylinders 11. Each cylinder 11 is a space defined inside the engine main body 10A. While this is not shown, each cylinder 11 houses a piston. The pistons can reciprocate inside the respective cylinders 11. The pistons inside the cylinders 11 are each coupled to the crankshaft 20 through a connecting rod. The crankshaft 20 rotates in accordance with the reciprocation of the pistons inside the cylinders 11. The crank angle sensor 88 is located near the crankshaft 20. The crank angle sensor 88 detects a rotation position of the crankshaft 20 as a detected rotation position Scr.

The internal combustion engine 10 has four spark plugs 19. The spark plugs 19 are respectively provided in the cylinders 11. A tip of each spark plug 19 is located inside the corresponding cylinder 11. The spark plugs 19 ignite an air-fuel mixture composed of air and fuel inside the corresponding cylinders 11 by spark discharge.

The internal combustion engine 10 has an intake air passage 15, an air flowmeter 87, a throttle valve 13, and four fuel injection valves 17. The intake air passage 15 is a passage through which air is taken into each cylinder 11. The intake air passage 15 is connected to each cylinder 11. The air flowmeter 87 is located at an intermediate point in the intake air passage 15. The air flowmeter 87 detects an amount of intake air as a detected intake air amount GA. The throttle valve 13 is located in the intake air passage 15, on a downstream side of the air flowmeter 87. The throttle valve 13 adjusts the amount of intake air. The four fuel injection valves 17 are located in the intake air passage 15, on the downstream side of the throttle valve 13. The four fuel injection valves 17 are respectively provided in the cylinders 11. The four fuel injection valves 17 inject fuel. The fuel injected by each fuel injection valve 17 is supplied to the corresponding cylinder 11.

The internal combustion engine 10 has an exhaust gas passage 21, a three-way catalyst 22, and a gasoline particulate filter (hereinafter referred to as a "GPF") 23. The exhaust gas passage 21 is a passage through which exhaust gas is discharged from the cylinders 11. The exhaust gas passage 21 is connected to each cylinder 11. The three-way catalyst 22 is located at an intermediate point in the exhaust gas passage 21. The three-way catalyst 22 removes harmful components from the exhaust gas. The three-way catalyst 22 has an oxygen storage capacity. The GPF 23 is located in the exhaust gas passage 21, on the downstream side of the three-way catalyst 22. The GPF 23 collects fine particulate matter contained in the exhaust gas.

The internal combustion engine 10 has an air-fuel ratio sensor 81, a first temperature sensor 83, and a second temperature sensor 84. The air-fuel ratio sensor 81 is located in the exhaust gas passage 21, on an upstream side of the three-way catalyst 22. The air-fuel ratio sensor 81 detects the air-fuel ratio of gas in the exhaust gas passage 21, on the upstream side of the three-way catalyst 22, as a detected air-fuel ratio AS. The first temperature sensor 83 is located in the exhaust gas passage 21, between the three-way catalyst 22 and the GPF 23. The first temperature sensor 83 detects the temperature of gas in the exhaust gas passage 21, between the three-way catalyst 22 and the GPF 23, as a first detected temperature T1. The second temperature sensor 84 is located in the exhaust gas passage 21, on the downstream side of the GPF 23. The second temperature sensor 84 detects the temperature of gas in the exhaust gas passage 21, on the downstream side of the GPF 23, as a second detected temperature T2. The first temperature sensor 83 and the second temperature sensor 84 constitute state detection sensors.

General Configuration of Control Device

The vehicle 500 has a control device 100. The control device 100 can be configured as one or more processors that execute various processes in accordance with computer programs (software). Alternatively, the control device 100 may be configured as one or more dedicated hardware circuits, such as application-specific integrated circuits (ASICs), that execute at least some of the various processes, or as a circuitry including a combination of such dedicated hardware circuits. The processor includes a CPU and a memory, such as an RAM and an ROM. The memory stores program codes or commands configured to cause the CPU to execute processes. The memory, i.e., a computer-readable medium, may be any available medium that can be accessed by a general-purpose or dedicated computer. The control device 100 has a storage device that is an electrically rewritable non-volatile memory.

The control device 100 receives detection signals from various sensors mounted in the vehicle 500. Specifically, the control device 100 receives detection signals for the following parameters:

- the accelerator operation amount ACP detected by the accelerator sensor 91;
- the vehicle speed SP detected by the vehicle speed sensor 92;
- the battery information B detected by the battery sensor 89;
- the detected intake air amount GA detected by the air flowmeter 87;
- the detected rotation position Scr detected by the crank angle sensor 88;
- the detected air-fuel ratio AS detected by the air-fuel ratio sensor 81;
- the first detected temperature T1 detected by the first temperature sensor 83; and
- the second detected temperature T2 detected by the second temperature sensor 4.

Based on the detected rotation position Scr, the control device 100 calculates an engine speed NE that is the number of rotations per unit time of the crankshaft 20. Based on the battery information B, the control device 100 calculates a stored electricity amount SOC of the battery 73.

The control device 100 has a general control unit 102. The general control unit 102 controls the internal combustion engine 10, the first MG 71, and the second MG 72. Based on the accelerator operation amount ACP and the vehicle speed SP, the general control unit 102 calculates a demanded vehicle output that is a demanded value of the drive force of the vehicle 500. Based on the demanded vehicle output and the stored electricity amount SOC, the general control unit 102 calculates a demanded engine torque TE that is a demanded value of the output torque of the internal combustion engine 10. Further, based on the demanded vehicle output and the stored electricity amount SOC, the general control unit 102 calculates a demanded first MG torque TG1 that is a demanded value of the motoring torque or the regenerative torque of the first MG 71. In addition, based on the demanded vehicle output and the stored electricity amount SOC, the general control unit 102 calculates a demanded second MG torque TG2 that is a demanded value of the motoring torque or the regenerative torque of the second MG 72. The general control unit 102 controls the internal combustion engine 10 according to the demanded engine torque TE. The general control unit 102 controls the first MG 71 according to the demanded first MG torque TG1 and controls the second MG 72 according to the demanded second MG torque TG2.

Motoring Process

The general control unit 102 can execute a motoring process as a process for controlling the internal combustion engine 10 and the first MG 71. The motoring process is a process of rotating the crankshaft 20 by the first MG 71 in a state where fuel supply to the cylinders 11 of the internal combustion engine 10 is stopped. In the motoring process, the general control unit 102 controls the internal combustion engine 10 so as to stop fuel injection from the fuel injection valves 17 and ignition by the spark plugs 19. In the motoring process, the general control unit 102 controls the first MG 71 such that the engine speed NE meets an idle speed. The idle speed is a minimum limit of the engine speed NE at which the internal combustion engine 10 can independently continue operation. The general control unit 102 can execute the motoring process in response to an execution demand signal for the motoring process that is output by another functional unit of the control device 100. The general control unit 102 executes the motoring process when there is no output demand for the internal combustion engine 10, i.e., when the demanded engine torque TE is zero or lower.

First Process

The control device 100 performs processes involved in diagnosing the vehicle 500. In the following, these diagnosis processes will be described.

The control device 100 has a first processing unit 104. The first processing unit 104 can execute a first process as a process for diagnosing the internal combustion engine 10. The first processing unit 104 can execute a first diagnosis process as part of the first process. The first diagnosis process is a process of, when first execution conditions are met, diagnosing whether the air-fuel ratio sensor 81 has an abnormality based on the detected air-fuel ratio AS while executing the motoring process. The first execution conditions include the following items.

(A1) The first diagnosis process has not yet been completed during one trip.
(A2) The crankshaft 20 is rotating.
(A3) There is no output demand for the internal combustion engine 10.

Regarding item (A1), one trip refers to a period from when an ignition switch of the vehicle 500 is turned on until it is turned off. Item (A1) is set such that the first diagnosis process is completed at least once during one trip.

Item (A2) is provided in view of electricity consumed by performing the motoring process. As described above, the first diagnosis process involves execution of the motoring process. Performing the motoring process with rotation of the crankshaft 20 stopped consumes electricity corresponding to the power required to raise the engine speed NE to the idle speed by starting rotation of the crankshaft 20 using the first MG 71. Item (A2) is set such that performing the motoring process while the crankshaft 20 is stopped is avoided, and that the motoring process is performed to perform the first diagnosis process only when the crankshaft 20 is already rotating.

Item (A3) is set as a requirement necessary for performing the motoring process.

In the first diagnosis process, whether the air-fuel ratio sensor 81 has an abnormality is diagnosed using the following diagnosis technique. The first processing unit 104 diagnoses the air-fuel ratio sensor 81 using the detected air-fuel ratio AS that is detected when a predetermined first determination period H1 has elapsed since the start of the motoring process. When the detected air-fuel ratio AS detected after a lapse of the first determination period H1 has a value within a predetermined criterial range, the first processing unit 104 determines that the air-fuel ratio sensor 81 is normal, and when this is not the case, the first processing unit 104 determines that the air-fuel ratio sensor 81 has an abnormality. When the motoring process is started and the crankshaft 20 rotates with fuel supply to the cylinders 11 stopped, air is discharged from the cylinders 11 to the exhaust gas passage 21. The first determination period H1 is specified by experiment, for example, as a time taken for the gas flowing through the exhaust gas passage 21 to be replaced with air after the start of the motoring process. The first determination period H1 is, for example, a few seconds. The criterial range is specified by experiment, for example, as a range of the value that the air-fuel ratio sensor 81 should detect when the gas flowing through the exhaust gas passage 21 has been replaced with air.

Second Process

The control device 100 has a second processing unit 106. The second processing unit 106 can execute a second process as a process for diagnosing the internal combustion engine 10. The second processing unit 106 can execute a second diagnosis process as part of the second process. The second diagnosis process is a process of, when second execution conditions are met, diagnosing whether the GPF 23 has an abnormality based on the detected temperatures that are detected by the first temperature sensor 83 and the second temperature sensor 84 while executing the motoring process. In the second diagnosis process, the second processing unit 106 mainly diagnoses whether the GPF 23 is missing as an abnormality of the GPF 23. That the GPF 23 is missing means that the GPF 23 has been removed from the exhaust gas passage 21. Situations where the GPF 23 has been removed from the exhaust gas passage 21 include a situation where the whole GPF 23 has been removed from the exhaust gas passage 21, and a situation where a part of the GPF 23, for example, a part of the GPF 23 on the downstream side from the center, has been removed from the exhaust gas passage 21.

The second execution conditions include the following items.

(B1) The second diagnosis process has not yet been completed during one trip.
(B2) The crankshaft 20 is rotating.
(B3) There is no output demand for the internal combustion engine 10.
(B4) The first detected temperature T1 is equal to or higher than a specified temperature TK.
(B5) The first detected temperature T1 is equal to or higher than the second detected temperature T2.

Items (B1) to (B3) are set from the same viewpoints as items (A1) to (A3) of the first execution conditions. Items (B4) and (B5) are set for the necessity of securing diagnostic accuracy of the second diagnosis process. The reasons why items (B4) and (B5) are required as the second execution conditions will be described later.

Diagnostic Principle of Second Diagnosis Process

In the second diagnosis process, a diagnosis about the GPF 23 is performed using the temperatures of gas around the GPF 23. First, the principle of this diagnosis and a parameter that is used as an index for the diagnosis will be described.

Figure 2A:
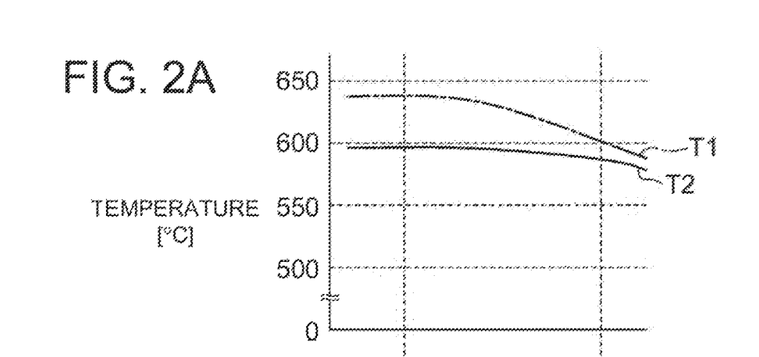
FIG. 2A is a graph showing an example of changes over time in parameters after the start of a motoring process in a case where a GPF is normal.
Figure 3A:
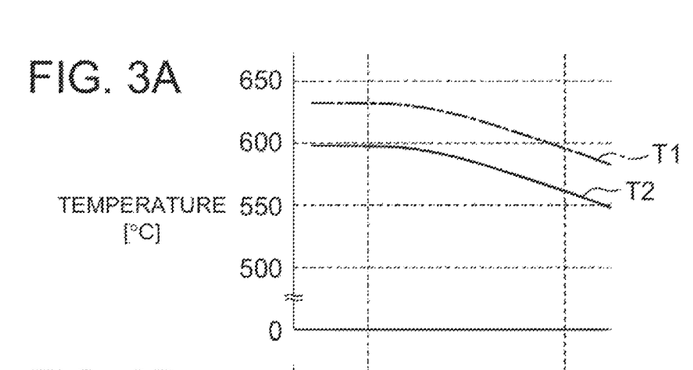
FIG. 3A is a graph showing an example of changes over time corresponding to FIG. 2A, in a case where the GPF has an abnormality.

As described above, when the motoring process is started, air is discharged from the cylinders 11 to the exhaust gas passage 21. As air is discharged, the temperature of gas flowing through the exhaust gas passage 21 decreases gradually. Specifically, as shown in FIG. 2A, when the motoring process is started at time tm1, for example, thereafter, both the first detected temperature T1 on the upstream side of the GPF 23 and the second detected temperature T2 on the downstream side of the GPF 23 decrease as time passes. As indicated by the thin arrows in FIG. 1, when the GPF 23 is present in the exhaust gas passage 21, the gas receives heat from the GPF 23 that has been heated to a high temperature by the heat of the exhaust gas before the start of the motoring process, while passing through the GPF 23. Therefore, as shown in FIG. 2A, the amount of decrease in the second detected temperature T2 from the start of the motoring process is smaller than the amount of decrease in the first detected temperature T1. On the other hand, when the GPF 23 has been removed from the exhaust gas passage 21, the gas does not receive heat from the GPF 23. Thus, as shown in FIG. 3A, when the GPF 23 has been removed from the exhaust gas passage 21, the amount of decrease in the second detected temperature T2 and the amount of decrease in the first detected temperature T1 become equivalent after time tm1 at which the motoring process is started. In the second diagnosis process, whether the GPF 23 has an abnormality is diagnosed using these temperature change characteristics associated with heat exchange between the GPF 23 and the gas. As described in item (B4), the GPF 23 is diagnosed when the first detected temperature T1 on the upstream side of the GPF 23 is equal to or higher than the second detected temperature T2 on the downstream side. In this connection, in the examples shown in FIG. 2A and FIG. 3A, the first detected temperature T1 is higher than the second detected temperature T2. The reason why item (B4) is required as the second execution condition will be described later.

As an index indicating the above temperature change characteristics, a detection parameter Z is used in the second diagnosis process. The detection parameter Z is a variable representing the amount of heat that the gas receives from the GPF 23 while passing through the GPF 23, and is specified based on the amount of change in the amount of heat of the gas around the GPF 23 (hereinafter referred to as a "heat change amount"). Here, the relationship of Expression (1) exists between a heat change amount $\Delta Q1$ of the gas on the upstream side of the GPF 23, a heat amount $\Delta Qg$ that the gas receives from the GPF 23, and a heat change amount $\Delta Q2$ of the gas on the downstream side of the GPF 23. In other words, a value obtained by adding the heat amount $\Delta Qg$ that the gas receives from the GPF 23 to the heat change amount $\Delta Q1$ of the gas on the upstream side of the GPF 23 equals the heat change amount $\Delta Q2$ of the gas on the downstream side of the GPF 23:

$$\Delta Q1 + \Delta Qg = \Delta Q2 \qquad (1)$$

Expression (1) can be transformed into Expression (2) below as a relational expression showing the heat amount $\Delta Qg$ that the gas receives from the GPF 23. Specifically, the heat amount $\Delta Qg$ that the gas receives from the GPF 23 can be calculated as a value obtained by subtracting the heat change amount $\Delta Q1$ on the upstream side of the GPF 23 from the heat change amount $\Delta Q2$ on the downstream side of the GPF 23.

$$\Delta Qg = \Delta Q2 - \Delta Q1 \qquad (2)$$

The amount of change in the heat of gas is the product of the specific heat, the amount of gas, and the amount of change in the gas temperature. The specific heat is the same and the amount of gas is also the same on the upstream side and the downstream side of the GPF 23. Therefore, when the product of the specific heat and the amount of gas is represented by a gas constant V, the right side of Expression (2) can be bundled by the gas constant V to divide the right side into the gas constant V and a term relating to the amount of change in the gas temperature. Thus, as shown in Expression (3), the heat amount $\Delta Qg$ that the gas receives from the GPF 23 can be expressed as the product of the gas constant V and the term relating to the amount of change in the gas temperature. The term relating to the amount of change in the gas temperature is obtained by subtracting an amount of change in the temperature on the upstream side of the GPF 23, i.e., a change amount $\Delta T1$ of the first detected temperature T1 (hereinafter referred to as a first temperature change amount) from an amount of change in the temperature on the downstream side of the GPF 23, i.e., a change amount $\Delta T2$ of the second detected temperature T2 (hereinafter referred to as a second temperature change amount). The amount of change in the temperature is a value obtained by, for example, based on an assumption that the gas temperature has changed during a certain fixed period, subtracting the gas temperature at a first timing in the fixed period from the gas temperature at the last timing in the fixed period.

$$\Delta Qg = V \cdot (\Delta T2 - \Delta T1) \quad (3)$$

As shown in Expression (4), the detection parameter Z is provided as the term relating to the amount of change in the gas temperature in Expression (3). In connection with Expression (3), the detection parameter Z has a proportional relationship with the amount of heat that the gas receives from the GPF 23 while passing through the GPF 23. In other words, the detection parameter Z is a variable representing the amount of heat that the gas receives from the GPF 23 while passing through the GPF 23.

$$Z = (\Delta T2 - \Delta T1) \quad (4)$$

Figure 2B:
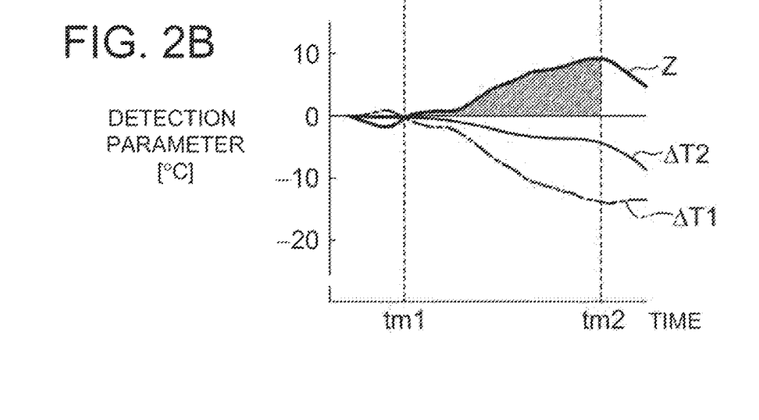
FIG. 2B is a graph showing an example of changes over time in parameters after the start of a motoring process in a case where a GPF is normal.

The detection parameter Z can assume either a positive value or a negative value according to the first temperature change amount ΔT1 and the second temperature change amount ΔT2. As described above, when the motoring process is started, the temperature of the gas flowing through the exhaust gas passage 21 decreases. Therefore, according to the definition of the amount of change in the temperature described above, both the first temperature change amount ΔT1 and the second temperature change amount ΔT2 assume negative values as shown in FIG. 2B.

Specific Diagnosis Technique of Second Diagnosis Process

In the second diagnosis process, a diagnosis about the GPF 23 is performed using the detection parameter Z as follows. As shown in FIG. 2B, for example, the second processing unit 106 calculates the detection parameter Z over each unit time after time tm1 at which the motoring process is started. Then, the second processing unit 106 integrates the calculated detection parameters Z until time tm2 at which a second determination period H2 has elapsed since time tm1. The unit time is equal to a time interval at which the control device 100 receives the first detected temperature T1 and the second detected temperature T2. The second processing unit 106 calculates the first temperature change amount ΔT1 per unit time by subtracting, from the latest first detected temperature T1 received by the control device 100, the first detected temperature T1 received at an immediately preceding timing. The second processing unit 106 calculates the second temperature change amount ΔT2 in the same manner. By applying the calculated first temperature change amount ΔT1 and second temperature change amount ΔT2 to Expression (4), the second processing unit 106 calculates the detection parameter Z over each unit time.

When the integrated value of the detection parameter Z thus calculated is positive and the value is large, this means that the gas has received a large amount of heat from the GPF 23. In this case, it can be presumed that the GPF 23 is present in the exhaust gas passage 21, i.e., that the GPF 23 is normal, and that heat has been exchanged between the GPF 23 and the gas. As described above, when the GPF 23 is normal, the second detected temperature T2 on the downstream side of the GPF 23 includes the influence of heat from the GPF 23. Therefore, as shown in FIG. 2B, when the GPF 23 is normal, the second temperature change amount ΔT2 that is a negative value becomes larger than the first temperature change amount ΔT1 that is a negative value. Reflecting this characteristic, the integrated value of the detection parameter Z becomes larger than zero. In FIG. 2B, the integrated value of the detection parameter Z is represented by the dotted area.

Figure 3B:
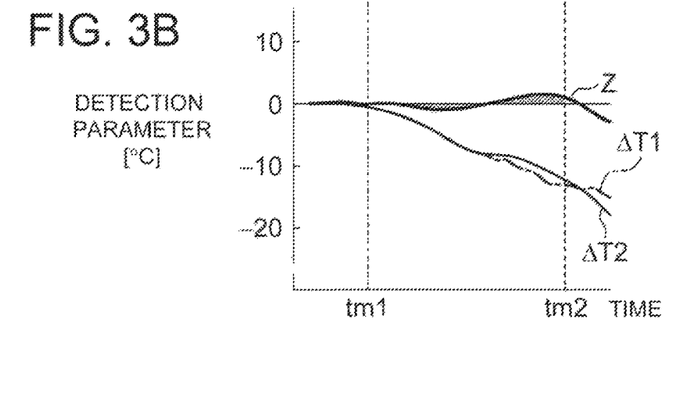
FIG. 3B is a graph showing an example of changes over time corresponding to FIG. 2B, in a case where the GPF has an abnormality.

Conversely, as shown in FIG. 3B, when the integrated value of the detection parameter Z calculated by the second processing unit 106 is small, this means that the amount of heat that the gas has received from the GPF 23 is small. In this case, it can be presumed that the whole or a part of the GPF 23 has been removed from the exhaust gas passage 21, i.e., that the GPF 23 has an abnormality, and that no heat or a little heat has been exchanged between the GPF 23 and the gas. As shown in FIG. 3B, when the GPF 23 has an abnormality, the difference between the second temperature change amount ΔT2 and the first temperature change amount ΔT1 becomes small. Reflecting this characteristic, the integrated value of the detection parameter Z becomes close to zero.

On this basis, in the second diagnosis process, the second processing unit 106 determines that the GPF 23 is normal when the integrated value of the detection parameter Z is equal to or larger than a predetermined criterial value ZK. On the other hand, when the integrated value of the detection parameter Z is smaller than the criterial value ZK, the second processing unit 106 determines that the GPF 23 has an abnormality. The second determination period H2 is specified by experiment, for example, as such a length that a difference between the integrated value of the detection parameter Z when the GPP 23 is normal and that when the GPF 23 has an abnormality can be clearly discerned. The second determination period H2 is equal to the first determination period H1 and is, for example, a few seconds. The criterial value ZK is specified by experiment, for example, as a minimum value that the integrated value of the detection parameter Z can assume when the second determination period H2 has elapsed since the start of the motoring process in the case where the GPF 23 is normal.

Item (B4) of Second Execution Conditions

For the necessity of increasing the diagnostic accuracy when using the above-described technique, the second execution conditions include item (B4): The first detected temperature T1 is equal to or higher than the specified temperature TK. The reason will be described below.

The higher the temperature of the exhaust gas at the start of the motoring process, the larger the amount of decrease in the gas temperature until the gas temperature becomes stable to some extent after the start of the motoring process. Since the second process uses the characteristic that the gas temperature decreases after the start of the motoring process, a reasonable amount of decrease in the gas temperature needs to be secured. First, item (B4) is essential from this perspective. In addition, the thermodynamic properties of the gas are such that the higher the temperature of the exhaust gas at the point of starting the motoring process, the higher the speed with which the gas temperature decreases after the start of the motoring process. Here, a case where the temperature of the exhaust gas is low at the point of starting the motoring process will be considered. In this case, in the calculation of the detection parameter Z over each unit time, the first temperature change amount ΔT1 per unit time and the second temperature change amount ΔT2 per unit time after the start of the motoring process become small due to the aforementioned thermodynamic properties of the gas. In such a situation, even when the GPF 23 is present in the exhaust gas passage 21 and the gas receives heat from the GPF 23, hardly any difference occurs between the first temperature change amount ΔT1 per unit time and the second temperature change amount ΔT2 per unit time.

Therefore, the detection parameter Z per unit time becomes close to zero. In this case, it is difficult to accurately diagnose the GPF 23 due to the difficulty of making a distinction between normality and abnormality of the GPF 23 upon calculating the integrated value of the detection parameter Z.

By contrast, when the temperature of the exhaust gas is high at the point of starting the motoring process, the first temperature change amount ΔT1 per unit time and the second temperature change amount ΔT2 per unit time become basically large. Therefore, when the GPF 23 is present in the exhaust gas passage 21 and the gas receives heat from the GPF 23, a difference between the first temperature change amount ΔT1 per unit time and the second temperature change amount ΔT2 per unit time is likely to occur, so that the detection parameter Z per unit time, and in turn the integrated value of the detection parameter Z, become large. Thus, the GPF 23 can be accurately diagnosed, with an appropriate distinction made between normality and abnormality of the GPF 23.

For these reasons, item (B4) is provided as one of the second execution conditions. The specified temperature TK is specified by experiment, for example, as such a temperature that the GPF 23 can be accurately diagnosed using the detection parameter Z. The specified temperature TK is, for example, 550° C. In item (B4), the first detected temperature T1 on the upstream side of the GPF 23, and not the second detected temperature T2 on the downstream side, is compared with the specified temperature TK. The reason is as follows. As described above, while the value of the second detected temperature T2 varies according to the presence or absence of the GPF 23, the value of the first detected temperature T1 does not vary according to the presence or absence of the GPF 23. Using the first detected temperature T1 of which the value does not vary according to the presence or absence of the GPF 23 is suitable for grasping the temperature environment around the GPF 23 always by the same standard regardless of the presence or absence of the GPF 23.

Item (B5) of Second Execution Conditions

As with item (B4), for the necessity of increasing the diagnostic accuracy, the second execution conditions include item (B5): The first detected temperature T1 is equal to or higher than the second detected temperature T2.

As described in connection with the contents of item (B4), to accurately diagnose the GPF 23 using the detection parameter Z, it is preferable that the detection parameter Z when the GPF 23 is normal have a value larger than zero as much as possible. To achieve this, it is preferable that the second diagnosis process be performed in an engine operation state where the value of the detection parameter Z is likely to become large. After the motoring process is started, both the first temperature change amount ΔT1 and the second temperature change amount ΔT2 that specify the detection parameter Z assume negative values. Therefore, after the start of the motoring process, if the absolute value of the first temperature change amount ΔT1 per unit time is large and the absolute value of the second temperature change amount ΔT2 per unit time is small, the detection parameter Z per unit time becomes large. In other words, if the decrease speed of the first detected temperature T1 is high and the decrease speed of the second detected temperature T2 is low, the value of the detection parameter Z becomes large. Therefore, as an engine operation state where the second diagnosis process is performed, a situation where it is likely that the first detected temperature T1 has a high decrease speed while the second detected temperature T2 has a low decrease speed is advantageous in increasing the diagnostic accuracy.

As described above, the characteristics of the decrease speed of the gas temperature are such that the higher the first detected temperature T1 is at the point of starting the motoring process, the higher the decrease speed of the first detected temperature T1. Further, the lower the second detected temperature T2 is at the point of starting the motoring process, the lower the decrease speed of the second detected temperature T2. Therefore, if the first detected temperature T1 is equal to or higher than the second detected temperature T2 at the point of starting the motoring process, this constitutes, from the start, an engine operation state where the decrease speed of first detected temperature T1 is likely to become higher than the decrease speed of the second detected temperature T2. When the first detected temperature T1 is equal to or higher than the second detected temperature T2 at the point of starting the motoring process, the value of the detection parameter Z when the GPF 23 has been removed from the exhaust gas passage 21 can become larger than zero. However, from the viewpoint of increasing the difference between the detection parameter Z when the GPF 23 is normal and that when the GPF 23 has an abnormality, the requirement that the first detected temperature T1 be equal to or higher than the second detected temperature T2 is highly effective.

In addition to the above contents, item (B5) is provided in view of the relationship between the travel state of the vehicle 500 and the temperature environment around the GPF 23. Due to the configuration of the exhaust gas passage 21, the situation where the first detected temperature T1 is equal to or higher than the second detected temperature T2 is one of situations that are likely to arise in the internal combustion engine 10 during travel of the vehicle 500. Specifically, the situation where the first detected temperature T1 is equal to or higher than the second detected temperature T2 is a situation that can naturally arise when the vehicle 500 is accelerating. Here, during acceleration of the vehicle 500, the three-way catalyst 22 located on the upstream side of the GPF 23 constitutes a heat source that generates heat as unburned fuel is burned. The first detected temperature T1 that is detected by the first temperature sensor 83 located between the three-way catalyst 22 and the GPF 23 basically reflects the temperature of the three-way catalyst 22. Meanwhile, the GPF 23 undergoes a temperature rise not by generating heat by itself but by receiving heat propagating from the three-way catalyst 22. Therefore, the temperature of the GPF 23 changes so as to follow the temperature of the three-way catalyst 22, after the temperature of the three-way catalyst 22 changes. The second detected temperature T2 that is detected by the second temperature sensor 84 located on the downstream side of the GPF 23 basically reflects the temperature of the GPF 23. Thus, during acceleration of the vehicle 500, the second detected temperature T2 rises so as to follow the first detected temperature T1. As a result, during acceleration of the vehicle 500, the first detected temperature T1 tends to become equal to or higher than the second detected temperature T2. Since there is this relationship between the travel state of the vehicle 500 and the temperature environment around the GPF 23, opportunities for meeting the requirement that the first detected temperature T1 be equal to or higher than the second detected temperature T2 can be sufficiently secured. Item (B5) is set also with this perspective taken into consideration.

The relationship between the first detected temperature T1 and the second detected temperature T2 during deceleration of the vehicle 500 is reverse to that during acceleration. As a premise, also during deceleration of the vehicle 500, the GPF 23 undergoes a temperature change by receiving heat propagating from the three-way catalyst 22. During deceleration of the vehicle 500, while the temperature of the GPF 23 remains high, the temperature of the three-way catalyst 22 decreases first and then the temperature of the GPF 23 decreases so as to follow the temperature of the three-way catalyst 22. Therefore, during deceleration, particularly extreme deceleration, of the vehicle 500, the first detected temperature T1 tends to become equal to or lower than the second detected temperature T2. Since item (B5) is set as the second execution condition, the second diagnosis process is basically not performed during deceleration of the vehicle 500.

Execution Determination Process

The control device 100 has an execution determination unit 108. The execution determination unit 108 can execute an execution determination process as a process of permitting or prohibiting execution of the first diagnosis process and the second diagnosis process. In the execution determination process, when at least either the first execution conditions or the second execution conditions are not met, the execution determination unit 108 prohibits execution of both the first diagnosis process and the second diagnosis process. On the other hand, in the execution determination process, when both the first execution conditions and the second execution conditions are met, the execution determination unit 108 permits execution of both the first diagnosis process and the second diagnosis process. As has been described so far, the control device 100 has the first processing unit 104, the second processing unit 106, and the execution determination unit 108 as functional units for diagnosing the internal combustion engine 10.

Specific Processing Procedure of First Process

Specific processing procedures of the first process, the second process, and the execution determination process will be described. The first processing unit 104, the second processing unit 106, and the execution determination unit 108 concurrently perform the first process, the second process, and the execution determination process. In this case, each of the first processing unit 104, the second processing unit 106, and the execution determination unit 108 performs the process with reference to on and off of a flag set by another functional unit.

The processing procedure of the first process will be described. When the ignition switch of the vehicle 500 is turned on, the first processing unit 104 starts the first process. In the first process, a first completion flag FC1 that is a flag indicating completion of the first diagnosis process is switched on and off. That the first completion flag FC1 is on means that the first diagnosis process has been completed, and that the first completion flag FC1 is of means that the first diagnosis process has not been completed. At the point when the ignition switch of the vehicle 500 is turned on, the first completion flag FC1 is off. Further, in the first process, a first condition flag FJ1 that indicates meeting of the first execution conditions is switched on and off That the first condition flag FJ1 is off means that the first execution conditions are not met, and that the first condition flag FJ1 is on means that the first execution conditions are met. At the point when the ignition switch of the vehicle 500 is turned on, the first condition flag FJ1 is off.

Figure 4:
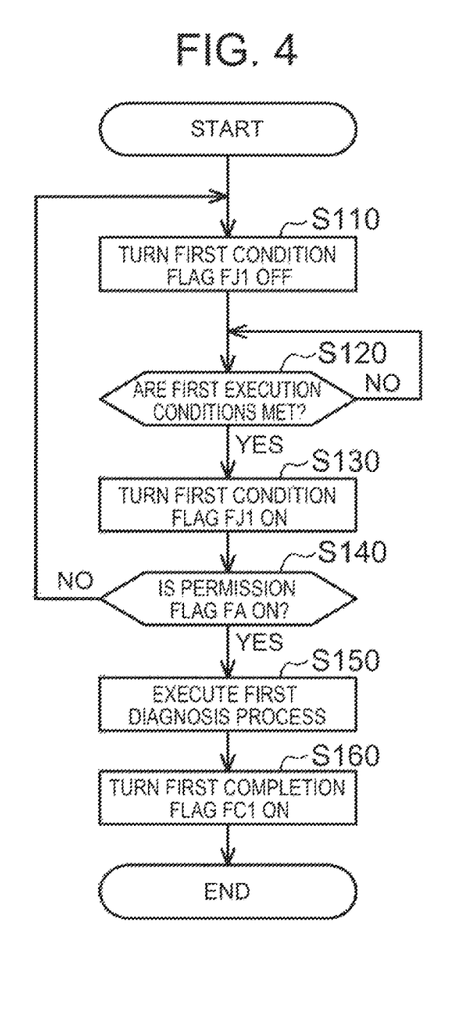
FIG. 4 is a flowchart showing a processing procedure of a first process.

As shown in FIG. 4, the first processing unit 104 starts the first process by executing the process of step S110. In step S110, the first processing unit 104 turns the first condition flag FJ1 off. When performing the process of step S110 for the first time after starting the first process, the first processing unit 104 maintains the turned-off state of the first condition flag FJ1. After executing the process of step S110, the first processing unit 104 moves the process to step S120.

In step S120, the first processing unit 104 determines whether the first execution conditions are met. That is, the first processing unit 104 determines whether all the three items (A1) to (A3) of the first execution conditions are met. As to non-completion of the diagnosis specified by item (A1), the first processing unit 104 determines whether this item is met with reference to the first completion flag FC1. When the first completion flag FC1 is off, the first processing unit 104 determines that the first diagnosis process has not been completed. Due to the setting of the processing contents of the first process, the first completion flag FC1 is always off when step S120 is executed. As will be described later, the first completion flag FC1 is turned on just before the end of the first process and the information on the first completion flag FC1 is used in the execution determination process.

As to rotation of the crankshaft 20 specified by item (A2), the first processing unit 104 determines whether this item is met with reference to the latest engine speed NE. When the engine speed NE is higher than zero, the first processing unit 104 determines that the crankshaft 20 is rotating, and when this is not the case, the first processing unit 104 determines that the crankshaft 20 is stopped.

As to an output demand for the internal combustion engine 10 specified by item (A3), the first processing unit 104 determines whether this item is met with reference to the latest demanded engine torque TE. When the demanded engine torque TE is zero or lower, the first processing unit 104 determines that there is no output demand for the internal combustion engine 10, and when this is not the case, the first processing unit 104 determines that there is an output demand for the internal combustion engine 10.

When there is even one item among the three items (A1) to (A3) that is not met, the first processing unit 104 determines that the first execution conditions are not met (step S120: NO). In this case, the first processing unit 104 executes the process of step S120 again. The first processing unit 104 repeats the process of step S120 until all the three items (A1) to (A3) are met. When all the three items (A1) to (A3) are met, the first processing unit 104 determines that the first execution conditions are met (step S120: YES). In this case, the first processing unit 104 moves the process to step S130.

In step S130, the first processing unit 104 turns the first condition flag FJ1 on. Then, the first processing unit 104 moves the process to step S140.

In step S140, the first processing unit 104 determines whether a permission flag FA is on. The permission flag FA is a flag that is switched on and off by the execution determination process. Switching on and off of this flag will be described later. The permission flag FA is a flag indicating permission or prohibition of execution of the first diagnosis process, and when the permission flag FA is on, execution of the first diagnosis process is permitted, and when the permission flag FA is off, the first diagnosis process is prohibited. When the permission flag FA is off (step S140: NO), the first processing unit 104 returns to the process of step S110. In this case, the first processing unit 104 performs the process of step S110 and the subsequent steps again.

When the permission flag FA is on (step S140: YES), the first processing unit 104 moves the process to step S150. A time interval between the end of the process of step S130 and the start of the process of step S140 is longer than a time interval required for the sequence of processes of the execution determination process.

In step S150, the first processing unit 104 executes the first diagnosis process. Specifically, the first processing unit 104 starts to output an execution demand signal for the motoring process to the general control unit 102. In response, the general control unit 102 starts the motoring process. Thereafter, the first processing unit 104 waits for the first determination period H1. When the first determination period H1 has elapsed since the start of outputting the execution demand signal for the motoring process, the first processing unit 104 stops outputting the execution demand signal. In response, the general control unit 102 ends the motoring process. After stopping outputting the execution demand signal for the motoring process, the first processing unit 104 refers to the latest detected air-fuel ratio AS. The first processing unit 104 determines whether the air-fuel ratio sensor 81 has an abnormality by determining whether the detected air-fuel ratio AS is within a criterial range. When the air-fuel ratio sensor 81 has an abnormality, the first processing unit 104 stores that fact and lights the first alert lamp 98. After executing the process of step S150, the first processing unit 104 moves the process to step S160.

In step S160, the first processing unit 104 turns the first completion flag FC1 on. Thereafter, the first processing unit 104 ends the sequence of processes of the first process. It is possible that, during execution of step S150, an output demand for the internal combustion engine 10 may be made, i.e., the demanded engine torque TE may become higher than zero. In this case, the first processing unit 104 suspends the process of step S150 and performs the first process from step S110 again.

Specific Processing Procedure of Second Process

The processing procedure of the second process will be described. The contents of the second process are basically the same as the contents of the first process that are adapted to be used for the second diagnosis process. Therefore, portions of the description of the second process that overlap with the first process will be abbreviated or omitted where appropriate.

Figure 5:
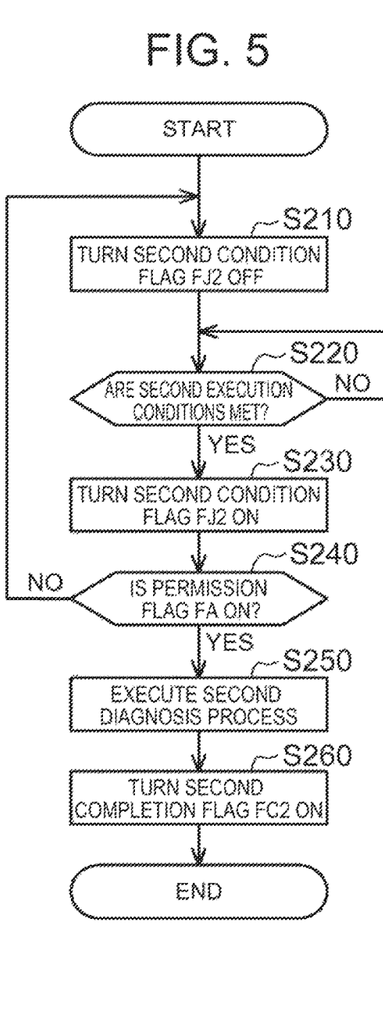
FIG. 5 is a flowchart showing a processing procedure of a second process.

When the ignition switch of the vehicle 500 is turned on, the second processing unit 106 starts the second process. In the second process, a second completion flag FC2 that is a flag indicating completion of the second diagnosis process is switched on and off. The second completion flag FC2 is similar to the first completion flag FC1. Further, in the second process, a second condition flag FJ2 indicating meeting of the second execution conditions is switched on and off. The second condition flag FJ2 is similar to the first condition flag FJ1. At the point when the ignition switch of the vehicle 500 is turned on, both the second completion flag FC2 and the second condition flag FJ2 are off.

As shown in FIG. 5, the second processing unit 106 starts the second process by executing the process of step S210. In step S210, the second processing unit 106 turns the second condition flag FJ2 off. After executing the process of step S210, the second processing unit 106 moves the process to step S220.

In step S220, the second processing unit 106 determines whether the second execution conditions are met. That is, the second processing unit 106 determines whether all the five items (B1) to (B5) of the second execution conditions are met. For items (B1) to (B3), the second processing unit 106 determines whether they are met in the same manner as in the first process. As to the requirement about the first detected temperature T1 specified by item (B3), the second processing unit 106 determines whether this item is met with reference to the latest first detected temperature T1. As to the high-low relationship between the first detected temperature T1 and the second detected temperature T2 specified by item (B5), the second processing unit 106 determines whether this item is met with reference to the latest values of the respective temperatures.

When even one item among the five items (B1) to (B5) is not met, the second processing unit 106 determines that the second execution conditions are not met (step S220: NO). In this case, the second processing unit 106 executes the process of step S220 again. The second processing unit 106 repeats the process of step S220 until all the five items (B1) to (B5) are met. When all the five items (B1) to (B5) are met, the second processing unit 106 determines that the second execution conditions are met (step S220: YES). In this case, the second processing unit 106 moves the process to step S230.

In step S230, the second processing unit 106 turns the second condition flag FJ2 on. Then, the second processing unit 106 moves the process to step S240.

In step S240, the second processing unit 106 determines whether the permission flag FA is on. The permission flag FA is a flag indicating not only permission or prohibition of execution of the first diagnosis process but also that of the second diagnosis process. When the permission flag FA is off (step S240: NO), the second processing unit 100 returns to the process of step S210. In this case, the second processing unit 106 performs the process of step S210 and the subsequent steps again.

When the permission flag FA is on (step S240: YES), the second processing unit 106 moves the process to step S250. As in the first process, a time interval between the end of the process of step S230 and the start of the process of step S240 is longer than the time interval required for the sequence of processes of the execution determination process.

In step S250, the second processing unit 106 executes the second diagnosis process. The second processing unit 106 starts to output an execution demand signal for the motoring process. Then, the second processing unit 10 calculates the detection parameter Z over each unit time and integrates the calculated detection parameters Z. The second processing unit 106 continues this process until the second determination period H2 has elapsed since the start of outputting the execution demand signal for the motoring process. When the second determination period H2 has elapsed, the second processing unit 106 stops outputting the execution demand signal for the motoring process. Thereafter, the second processing unit 106 determines whether the GPF 23 has an abnormality by determining whether the integrated value of the detection parameter Z is equal to or larger than the criterial value ZK. When the GPF 23 has an abnormality, the second processing unit 106 stores that fact in the storage device and lights the second alert lamp 99. After executing the process of step S250, the second processing unit 106 moves the process to step S260.

In step S260, the second processing unit 106 turns the second completion flag FC2 on. Thereafter, the second processing unit 106 ends the sequence of processes of the second process. When an output demand for the internal combustion engine 10 is made during execution of step S250, the second processing unit 106 suspends the process of step S250 and performs the second process from step S210 again.

Specific Processing Procedure of Execution Determination Process

Figure 6:
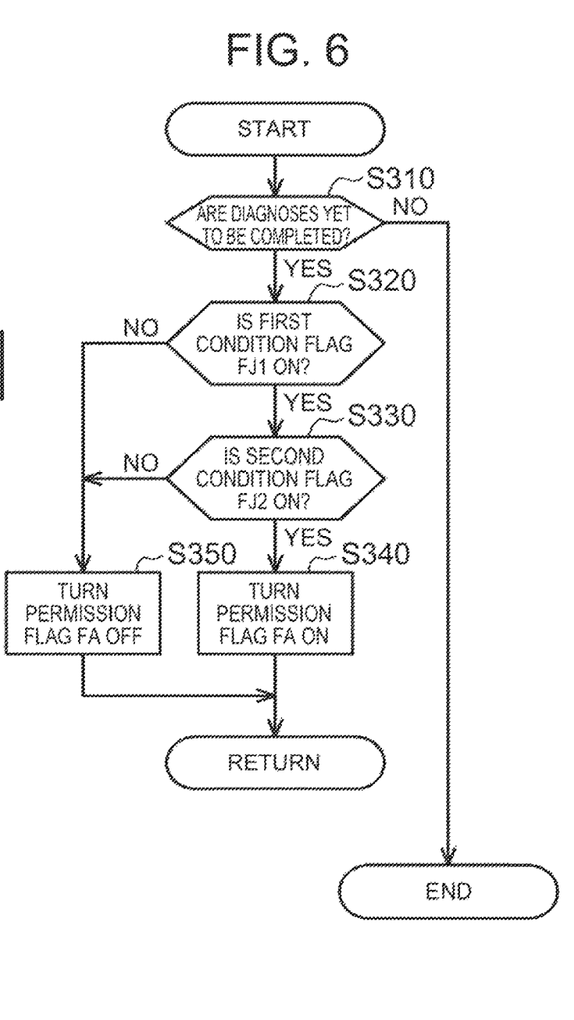
FIG. 6 is a flowchart showing a processing procedure of an execution determination process.

The processing procedure of the execution determination process will be described. When the ignition switch of the vehicle 500 is turned on, the execution determination unit 108 starts the execution determination process.

As shown in FIG. 6, the execution determination unit 108 starts the execution determination process by executing the process of step S310. In step S310, the execution determination unit 108 determines whether the first diagnosis process and the second diagnosis process are yet to be completed. The execution determination unit 108 performs the determination of step S310 with reference to the first completion flag FC1 set in the first diagnosis process and the second completion flag FC2 set in the second diagnosis process. When the first completion flag FC1 and the second completion flag FC2 are on (step S310: NO), i.e., when the first diagnosis process and the second diagnosis process have been completed, the execution determination unit 108 ends the sequence of processes of the execution determination processes.

When the first completion flag FC1 and the second completion flag FC2 are off (step S310: YES), i.e., when the first diagnosis process and the second diagnosis process are yet to be completed, the execution determination unit 108 moves the process to step S320.

In step S320, the execution determination unit 108 determines whether the first condition flag FJ1 is on with reference to the first condition flag FJ1 set in the first diagnosis process. When the first condition flag FJ1 is off, i.e., when the first execution conditions are not met (step S320: NO), the execution determination unit 108 moves the process to step S350.

In step S350, the execution determination unit 108 turns the permission flag FA of the first diagnosis process and the second diagnosis process off. Thereafter, the execution determination unit 108 temporarily ends the sequence of processes of the execution determination process and executes the process of step S310 again.

When the first condition flag FJ1 is on, i.e., when the first execution conditions are met in step S320 (step S320: YES), the execution determination unit 108 moves the process to step S330.

In step S330, the execution determination unit 108 determines whether the second condition flag FJ2 is on with reference to the second condition flag FJ2 set in the second diagnosis process. When the second condition flag FJ2 is off, i.e., when the second execution conditions are not met (step S330: NO), the execution determination unit 108 moves the process to step S350.

When the second condition flag FJ2 is on, i.e., when the second execution conditions are met in step S330 (step S330: YES), the execution determination unit 108 moves the process to step S340, in this case, both the first execution conditions and the second execution conditions are met.

In step S340, the execution determination unit 108 turns the permission flag FA on. Then, the execution determination unit 108 temporarily ends the sequence of processes of the execution determination process and executes the process of step S310 again.

Workings of Embodiment

The second execution conditions include the requirement about the temperature around the GPF 23 in addition to the same requirements relating to the motoring process as the first execution conditions. Therefore, even when the first execution conditions are met in step S120 of the first process (step S120: YES), depending on the operation state of the internal combustion engine 10, the second execution conditions may not be met in step S220 of the second process (step S220: NO). In this case, the first condition flag FJ1 is turned on in the first process, while the second condition flag FJ2 is turned off in the second process. In response to this setting of the condition flags, the permission flag FA is set to off in step S350 of the execution determination process. Then, in response to this setting of the permission flag FA, execution of the first process is postponed in step S140 of the first process (step S140: NO).

On the other hand, when the first execution conditions are met in step S120 of the First process (step S120: YES) and the second execution conditions are met in step S220 of the second process (step S220: YES), both the first condition flag FJ1 and the second condition flag FJ2 are turned on. In response to this setting of the condition flags, the permission flag FA is set to on in step S340 of the execution determination process. In response to this setting of the permission flag FA, the first diagnosis process is executed in step S150 of the first process and the second diagnosis process is executed in step S250 of the second process.

Effects of Embodiment (1) As described above with the workings, according to the embodiment, even when the first execution conditions are met, execution of both the diagnosis processes is prohibited unless the second execution conditions are met. It is therefore impossible that only the first diagnosis process for which there are fewer requirements is performed first. On the other hand, when both the first execution conditions and the second execution conditions are met, execution of both the diagnosis processes is permitted and both the diagnosis processes are executed at the same time. As such, this embodiment can minimize the number of times that the motoring process is executed to diagnose the internal combustion engine 10 using the motoring process. This contributes to, for example, minimizing the amount of electricity consumed by performing the motoring process.

(2) To diagnose whether the GPF 23 has an abnormality, it is conceivable to use the pressure of the gas around the GPF 23 instead of the temperature around the GPP 23. When the GPF 23 is present in the exhaust gas passage 21, the GPF 23 constitutes resistance to the gas flow, so that the gas pressure becomes lower on the downstream side than on the upstream side of the GPF 23. On the other hand, when the GPF 23 has been removed, the gas pressure becomes substantially equal on the upstream side and the downstream side of the GPF 23. These characteristics can be used to diagnose whether the GPF 23 has an abnormality. To perform a diagnosis using these characteristics, for example, a differential pressure sensor may be provided in the exhaust gas passage 21 and whether the difference between the gas pressure on the upstream side of the GPF 23 and the gas pressure on the downstream side of the GPF 23 is large or small may be determined. However, installing a differential pressure sensor in the exhaust gas passage 21 tends to be costly. Differential pressure sensors have a complicated structure due to features such as a gas chamber defined inside the sensor and a diaphragm provided to divide the gas chamber into two. Moreover, when using a differential pressure sensor, a connection passage that connects the differential pressure sensor to a portion of the exhaust gas passage 21 on the upstream side of the GPF 23, and a connection passage that connects the differential pressure sensor to a portion of the exhaust gas passage 21 on the downstream side of the GPF 23 are also required.

In this respect, in the embodiment, whether the GPF 23 has an abnormality is diagnosed based on detection values of the temperature sensors by using the characteristic that the gas temperature decreases after the start of the motoring process. Temperature sensors have a less complicated structure and can be directly mounted in the exhaust gas passage 21. Therefore, the configuration of the embodiment that uses temperature sensors can keep the costs down.

(3) In the embodiment, the detection parameter Z is used to diagnose whether the GPF 23 has an abnormality using the characteristic that the gas temperature decreases after the start of the motoring process. This detection parameter Z is obtained by simply subtracting the first temperature change amount ΔT1 from the second temperature change amount ΔT2. Thus, calculating the detection parameter Z does not require a complicated process, so that the processing load on the control device 100 involved in an abnormality diagnosis of the GPF 23 can be minimized.

(4) The three-way catalyst 22 is a heat source that generates heat as unburned fuel is burned, and has a higher heat capacity than the GPF 23. Therefore, basically, the temperature of the three-way catalyst 22 does not easily decrease. The first detected temperature T1 that is subjected to the influence of the temperature of such a three-way catalyst 22 basically does not easily decrease, and even when it decreases, the decrease speed tends to be low. From the viewpoint of calculating the detection parameter Z, this contributes to reducing the detection parameter Z by reducing the absolute value of the first temperature change amount ΔT1. Meanwhile, the GPF 23 undergoes a temperature rise not by generating heat by itself but only by receiving an amount of heat propagating from the three-way catalyst 22. Therefore, basically, the temperature of the GPF 23 decreases easily. The second detected temperature T2 that is subjected to the influence of the temperature of such a GPF 23 basically decreases easily, and when it decreases, the decrease speed tends to be high. From the viewpoint of calculating the detection parameter Z, this contributes to reducing the detection parameter Z by increasing the absolute value of the second temperature change amount ΔT2. Thus, basically, the environment around the GPF 23 makes it difficult to achieve high diagnostic accuracy in performing a diagnosis using the detection parameter Z.

In the embodiment, despite such disadvantageous conditions for achieving high diagnostic accuracy, whether the GPF 23 has an abnormality can be diagnosed with high diagnostic accuracy using the detection parameter Z by including item (B4) and item (B5) in the second execution conditions. As a result, effects (2) and (3) can be produced.

Modified Examples

The embodiment can be implemented with changes made thereto as follows. The embodiment and the following modified examples can be implemented in combinations within such a range that no technical inconsistency arises.

In the above embodiment, the first determination period H1 and the second determination period H2 have the same length. However, the first determination period H1 and the second determination period H2 may be set to different lengths. The first determination period H1 can be set to a length suitable for diagnosing whether the air-fuel ratio sensor 81 has an abnormality. The second determination period H2 can be set to a length suitable for diagnosing whether the GPF 23 has an abnormality. For example, the first determination period H1 may be set to be longer than the second determination period H2. In this case, the first diagnosis process continues after the second diagnosis process ends. Here, it is possible that the demanded engine torque TE may become higher than zero while the first diagnosis process is continued after the second diagnosis process ends. In this case, the first diagnosis process is suspended before being completed. Thus, a situation can arise where the second diagnosis process has been completed but the first diagnosis process has not been completed. In the case of the above embodiment, the second process ends with the second condition flag FJ2 on. Therefore, when the first execution conditions are met and the first condition flag FJ1 is turned on after the first diagnosis process is suspended and then the first process is resumed, the permission flag FA is turned on in the execution determination process. This makes it possible to execute only the first diagnosis process without executing the second diagnosis process. Therefore, the first diagnosis process can be completed also in this case. Even when a form in which the second condition flag FJ2 is turned off when the second process ends is adopted, it is possible to execute only the first diagnosis process after completion of the second diagnosis process by changing the contents of the execution determination process as appropriate. Specifically, the contents of the execution determination process can be changed such that, in the case where the second diagnosis process has been completed, execution of the first diagnosis process is permitted when only the first execution conditions are met, i.e., when the second condition flag is off and the first condition flag is on. When the second determination period H2 is set to be longer than the first determination period H1, the contents of the execution determination process can be changed based on the same idea as above.

How to specify the unit time for calculating the detection parameter Z can be changed as appropriate. The unit time may be any time interval that is suitable for calculating the integrated value of the detection parameter Z.

Item (B5) of the second execution conditions may be changed to a requirement that the vehicle 500 be accelerating. Also in this case, virtually the same requirement as in the above embodiment is set. To determine whether the vehicle 500 is accelerating, for example, a differential value of the vehicle speed SP may be used or an acceleration sensor may be provided in the vehicle 500.

Item (B5) of the second execution conditions may be omitted. Also in this case, a diagnosis can be performed with sufficiently high accuracy if item (B4) is set.

Regarding item (B4) of the second execution conditions, the second detected temperature T2 may be used instead of the first detected temperature T1. Thus, item (134) may be changed to a requirement that the second detected temperature T2 be equal to or higher than the specified temperature TK. A rough temperature around the GPF 23 can be grasped by the second detected temperature T2 as well.

Regarding item (134) of the second execution conditions, instead of the first detected temperature T1, for example, an estimated temperature of the exhaust gas based on an engine load factor may be used. Then, item (B4) may be changed to a requirement that the estimated temperature of the exhaust gas be equal to or higher than the specified temperature TK. The engine load factor represents the ratio of the current amount of air flowing into the cylinder to the amount of air flowing into the cylinder when the internal combustion engine 10 is operated at the current engine speed NE in a steady state with the throttle valve 13 fully opened. The amount of air flowing into the cylinder is the amount of air flowing into each of the cylinders 11 in an intake stroke.

Regarding item (134) of the second execution conditions, instead of using the temperature of the exhaust gas as an object to be determined, a variable representing the temperature of the exhaust gas may be used as an object to be determined. As such a variable, for example, the engine load factor may be adopted. Then, item (B4) may be changed to a requirement that the engine load factor be equal to or higher than a specified load factor. In this case, the specified load factor can be set to a value corresponding to the specified temperature TK.

The diagnosis technique used in the second diagnosis process is not limited to that using the detection parameter Z. As described in the above embodiment, the speed with which the second detected temperature T2 decreases after the start of the motoring process varies according to the presence or absence of the GPF 23. Therefore, whether the GPF 23 has an abnormality may be determined using the decrease speed of the second detected temperature T2 as an index.

The diagnosis technique used in the second diagnosis process is not limited to that using the temperatures. For example, the differential pressure between the upstream side and the downstream side of the GPF 23 may be used. Here, when the pressure of the exhaust gas is high, the differential pressure varies significantly according to the presence or absence of the GPF 23, whereas when the pressure of the exhaust gas is low, the differential pressure hardly varies. Therefore, to diagnose the GPF 23 using the differential pressure, an item that requires the pressure of the exhaust gas to be equal to or higher than a specified pressure can be set as the second execution condition. The specified pressure can be specified as the pressure of the exhaust gas required for accurately diagnosing whether the GPF 23 has an abnormality. When including the requirement about the pressure of the exhaust gas in the second execution conditions, for example, the pressure of the exhaust gas may be estimated from the detected intake air amount GA or a pressure sensor may be provided in the exhaust gas passage 21.

When diagnosing the GPF 23 using the differential pressure as in the above modified example, a requirement that the flow rate of the exhaust gas be equal to or higher than a specified flow rate may be set as the second execution condition. The specified flow rate in this case may be a value that is specified from the same perspective as the specified pressure. Further, a requirement that a variable representing the pressure of the exhaust gas or the flow rate of the exhaust gas be equal to or higher than a specified value may be set. As such a variable, for example, the engine load factor may be adopted.

As the diagnosis technique used in the second diagnosis process, instead of using the technique intended to diagnose whether the GPF 23 is present in the exhaust gas passage 21, a technique intended to diagnose another abnormality relating to the GPF 23 may be used. One example of another abnormality is clogging of the GPF 23.

The second execution conditions are not limited to the example of the above embodiment. As the second execution conditions, necessary conditions can be set according to the diagnosis technique used in the second diagnosis process. At a minimum, the second execution conditions should include a requirement that there be no output demand for the internal combustion engine 10, and should be different from the first execution conditions. For example, item (B2) may be omitted.

The diagnosis technique used in the first diagnosis process is not limited to the example of the above embodiment. In the first diagnosis process, a diagnosis technique suitable for diagnosing whether the air-fuel ratio sensor 81 has an abnormality can be used.

The first execution conditions are not limited to the example of the above embodiment. As the first execution conditions, necessary conditions can be set according to the diagnosis technique used in the first diagnosis process. At a minimum, the first execution conditions should include that there be no output demand for the internal combustion engine 10.

The configuration of the internal combustion engine 10 can be changed as appropriate. For example, an air-fuel ratio sensor may be separately provided in the exhaust gas passage 21, between the three-way catalyst 22 and the GPF 23.

When an air-fuel ratio sensor is provided in the exhaust gas passage 21, between the three-way catalyst 22 and the GPF 23, as in the above modified example, whether the air-fuel ratio sensor between the three-way catalyst 22 and the GPF 23 has an abnormality may be diagnosed instead of or in addition to diagnosing the air-fuel ratio sensor 81 on the upstream side of the three-way catalyst 22.

The overall configuration of the vehicle 500 is not limited to the example of the above embodiment. At a minimum, the vehicle 50) should have the internal combustion engine 10 and an electric motor that can rotate the crankshaft 20 of the internal combustion engine 10.

What is claimed is:

1. A control device of a hybrid electric vehicle applied to a hybrid electric vehicle having an internal combustion engine and an electric motor capable of rotating an output shaft of the internal combustion engine, the internal combustion engine including an air-fuel ratio sensor that detects an air-fuel ratio of exhaust gas, a filter that collects fine particulate matter in the exhaust gas, a first temperature sensor that detects a temperature of the exhaust gas on an upstream side of the filter and a second temperature sensor that detects a temperature of the exhaust gas on a downstream side of the filter, wherein the control device is programmed to execute:
a motoring process of rotating the output shaft of the internal combustion engine by the electric motor in a state where fuel supply to cylinders of the internal combustion engine is stopped;
a first diagnosis process of, when first execution conditions including that there is no output demand for the internal combustion engine are met, diagnosing whether the air-fuel ratio sensor has an abnormality based on a detection signal of the air-fuel ratio sensor while executing the motoring process;
a second diagnosis process of, when second execution conditions including that there is no output demand for the internal combustion engine and including that the temperature of the exhaust gas detected by the first temperature sensor or the second temperature sensor is equal to or higher than a specified temperature are met, diagnosing whether the filter has an abnormality based on a difference between the temperature of the exhaust gas on the upstream side of the filter and the temperature of the exhaust gas on the downstream side of the filter or a difference between a temperature change amount of the exhaust gas on the upstream side of the filter and a temperature change amount of the exhaust gas on the downstream side of the filter while executing the motoring process; and an execution determination process of prohibiting execution of both the first diagnosis process and the second diagnosis process when at least either the first execution conditions or the second execution conditions are not met, and executing both the first diagnosis process and the second diagnosis process when both the first execution conditions and the second execution conditions are met.

2. The control device of a hybrid electric vehicle according to claim 1, wherein, when an amount of change per unit time in the temperature detected by the first temperature sensor is called a first temperature change amount, and an amount of change per unit time in the temperature detected by the second temperature sensor is called a second temperature change amount, in the second diagnosis process, whether the filter has an abnormality is diagnosed based on a value obtained by integrating, over a fixed period after start of the motoring process, a detection parameter that is a value obtained by subtracting the first temperature change amount from the second temperature change amount.

3. The control device of a hybrid electric vehicle according to claim 2, wherein the second execution conditions include that the temperature detected by the first temperature sensor is equal to or higher than the temperature detected by the second temperature sensor.

4. The control device of a hybrid electric vehicle according to claim 1, wherein the second diagnosis process is diagnosing whether the filter is correctly mounted.

5. The control device of a hybrid electric vehicle according to claim 1, wherein the second diagnosis process is diagnosing whether there is a gas leak inside the filter.

6. The control device of a hybrid electric vehicle according to claim 1, wherein the second diagnosis process is diagnosing whether the filter has been removed.

7. A non-transitory computer readable medium storing a control program of a hybrid electric vehicle having an internal combustion engine and an electric motor capable of rotating an output shaft of the internal combustion engine, the internal combustion engine including an air-fuel ratio sensor that detects an air-fuel ratio of exhaust gas, a filter that collects fine particulate matter in the exhaust gas, a first temperature sensor that detects a temperature of the exhaust gas on an upstream side of the filter and a second temperature sensor that detects a temperature of the exhaust gas on a downstream side of the filter, the control program causing a control device of the hybrid electric vehicle to execute:

a motoring process of rotating the output shaft of the internal combustion engine by the electric motor in a state where fuel supply to cylinders of the internal combustion engine is stopped;

a first diagnosis process of, when first execution conditions including that there is no output demand for the internal combustion engine are met, diagnosing whether the air-fuel ratio sensor has an abnormality based on a detection signal of the air-fuel ratio sensor while executing the motoring process;

a second diagnosis process of, when second execution conditions including that there is no output demand for the internal combustion engine and including that the temperature of the exhaust gas detected by the first temperature sensor or the second temperature sensor is equal to or higher than a specified temperature are met, diagnosing whether the filter has an abnormality based on a difference between the temperature of the exhaust gas on the upstream side of the filter and the temperature of the exhaust gas on the downstream side of the filter or a difference between a temperature change amount of the exhaust gas on the upstream side of the filter and a temperature change amount of the exhaust gas on the downstream side of the filter while executing the motoring process; and an execution determination process of prohibiting execution of both the first diagnosis process and the second diagnosis process when at least either the first execution conditions or the second execution conditions are not met, and executing both the first diagnosis process and the second diagnosis process when both the first execution conditions and the second execution conditions are met.

8. A control device of a hybrid electric vehicle applied to a hybrid electric vehicle having an internal combustion engine and an electric motor capable of rotating an output shaft of the internal combustion engine, the internal combustion engine including an air-fuel ratio sensor that detects an air-fuel ratio of exhaust gas, a filter that collects fine particulate matter in the exhaust gas, a first pressure sensor that detects a pressure of the exhaust gas on an upstream side of the filter, and a second pressure sensor that detects a pressure of the exhaust gas on a downstream side of the filter, wherein the control device is programmed to execute:

a motoring process of rotating the output shaft of the internal combustion engine by the electric motor in a state where fuel supply to cylinders of the internal combustion engine is stopped;

a first diagnosis process of, when first execution conditions including that there is no output demand for the internal combustion engine are met, diagnosing whether the air-fuel ratio sensor has an abnormality based on a detection signal of the air-fuel ratio sensor while executing the motoring process;

a second diagnosis process of, when second execution conditions including that there is no output demand for the internal combustion engine and including that a pressure of the exhaust gas is equal to or higher than a specified pressure or a flow rate of the exhaust gas is equal to or higher than a specified flow rate are met, diagnosing whether the filter has an abnormality based on at least one of a difference between the pressure of the exhaust gas on the upstream side of the filter and the pressure of the exhaust gas on the downstream side of the filter, a difference between a flow rate of the exhaust gas on the upstream side of the filter and a flow rate of the exhaust gas on the downstream side of the filter, a difference between a pressure change amount of the exhaust gas on the upstream side of the filter and a pressure change amount of the exhaust gas on the downstream side of the filter, or a difference between a flow rate change amount of the exhaust gas on the upstream side of the filter and a flow rate change amount of the exhaust gas on the downstream side of the filter while executing the motoring process; and an execution determination process of prohibiting execution of both the first diagnosis process and the second diagnosis process when at least either the first execution conditions or the second execution conditions are not met, and executing both the first diagnosis process and the second diagnosis process when both the first execution conditions and the second execution conditions are met.

* * * * *